United States Patent
Hartig et al.

(10) Patent No.: US 7,210,369 B2
(45) Date of Patent: May 1, 2007

(54) BALL SCREW DRIVE

(75) Inventors: Gunter Hartig, Herzogenaurach (DE);
Jurgen Osterlanger, Emskirchen (DE);
Dieter Adler, Herzogenaurach (DE);
Manfred Kraus, Herzogenaurach (DE);
Ralf Mayer, Herzogenaurach (DE)

(73) Assignee: INA-Schaeffler KG (DE)

( * ) Notice: Subject to any disclaimer, the term of this patent is extended or adjusted under 35 U.S.C. 154(b) by 0 days.

(21) Appl. No.: 11/122,478

(22) Filed: May 5, 2005

(65) Prior Publication Data

US 2005/0252321 A1 Nov. 17, 2005

(30) Foreign Application Priority Data

May 12, 2004 (DE) .................. 10 2004 023 353

(51) Int. Cl.
*F16H 1/24* (2006.01)
*F16H 55/02* (2006.01)

(52) U.S. Cl. .................. 74/424.86; 74/424.71; 74/424.87

(58) Field of Classification Search ........... 74/89.42, 74/424.86, 424.82, 424.83, 424.84, 424.87, 74/89.23, 424.71, 424.79, 424.81, 424.88
See application file for complete search history.

(56) References Cited

U.S. PATENT DOCUMENTS

| | | | | |
|---|---|---|---|---|
| 1,122,649 | A * | 12/1914 | Sears .................. | 74/89.38 |
| 4,753,122 | A * | 6/1988 | Nishikawa et al. ...... | 74/424.96 |
| 5,012,687 | A * | 5/1991 | Hoshide .................. | 74/89.36 |
| 5,048,364 | A * | 9/1991 | Minamoto et al. ........... | 74/493 |
| 6,082,209 | A * | 7/2000 | Yabe et al. .............. | 74/424.83 |
| 6,851,722 | B2 * | 2/2005 | Chiu et al. ............... | 285/134.1 |
| 6,874,939 | B2 * | 4/2005 | Michioka et al. ............. | 384/45 |
| 7,040,189 | B2 * | 5/2006 | Michioka et al. ......... | 74/424.82 |
| 2003/0172759 | A1 * | 9/2003 | Hayashi ................... | 74/424.86 |
| 2004/0154421 | A1 * | 8/2004 | Pfister ..................... | 74/424.82 |
| 2005/0252320 | A1 * | 11/2005 | Hartig et al. .............. | 74/89.23 |

FOREIGN PATENT DOCUMENTS

EP  08 14 012 B1  8/2001
GB  22 36 828    4/1991

* cited by examiner

Primary Examiner—Richard Ridley
Assistant Examiner—James Pilkington
(74) Attorney, Agent, or Firm—Charles A. Muserlian

(57) ABSTRACT

In a ball screw drive comprising a spindle nut (2) that can be disposed on a spindle (1), said spindle nut (2) comprising on an inner periphery, a ball groove (3) that is arranged along a helix and defines a load-bearing channel (6) for balls (5), an external deflector (7) comprising a return channel (8) for the balls (5) being arranged on an outer periphery of the spindle nut (2), said external deflector (7) comprising two ball openings (E1, E2), each of which is connected to an end of the load-bearing channel (6) to deflect the balls (5) from one end of the load-bearing channel (6) to the other end of the load-bearing channel (6), the external deflector (7) extends from one of the two ball openings (E1) to the other of the two ball openings (E2) at least approximately over one full winding about an axis of rotation of the spindle nut (2).

10 Claims, 5 Drawing Sheets

BALL SCREW DRIVE

FIELD OF THE INVENTION

The invention concerns a ball screw drive that is used, for example, as a component of an electromechanical steering boost in steering equipments of automotive vehicles.

BACKGROUND OF THE INVENTION

EP 0 814 012 B1, for instance, discloses an electric steering booster device incorporating a ball screw drive. In this prior art, an axial extension of a toothed rack comprises a spindle on which a spindle nut is arranged. Balls arranged between the spindle and the spindle nut roll in ball grooves configured on the inner periphery of the spindle nut and the outer periphery of the spindle. These ball grooves define a load-bearing channel in which the balls roll under load. For forming an endless circuit of balls, the spindle nut comprises a so-called external deflector having two ball openings, each of which is connected to a respective end of the load-bearing channel to achieve an endless deflection of the balls from one end of the load-bearing channel to the other end of the load-bearing channel. The external deflector winds around approximately 180° about the outer periphery of the spindle nut. At the end of the load-bearing channel that generally comprises several windings, the balls are deflected into the external deflector. Within this deflector, the balls move in the load-free return channel. They are deflected from there to the beginning of the load-bearing channel and roll again along the ball grooves. At its axial ends, the spindle nut is supported radially through a groove ball bearing. Further, a toothed wheel is arranged rotationally fast on the spindle nut and meshes with a drive pinion of an electromotor. When a driven spindle nut is used, it is important for a largely disturbance-free operation to be guaranteed.

OBJECTS OF THE INVENTION

It is an object of the invention to provide a ball screw drive of the pre-cited that operates in a reliable manner.

This and other objects and advantages of the invention will become obvious from the following detailed description.

SUMMARY OF THE INVENTION

The invention achieves the above objects by the fact that the external deflector extends from one of the two ball openings to the other of the two ball openings at least approximately over one full winding about the axis of rotation of the spindle nut. When, for example, the spindle nut is driven by a stationary drive pinion, the spindle nut rotates together with its external deflector relative to the point of force application. Due to the fact that the external deflector surrounds the spindle axis over approximately 360°, it is assured that the same number of balls transmit the load in the load-bearing channel in the region of force application throughout a full rotation of the spindle nut. In contrast, from prior art ball screw drives, external deflectors with a deflection of about 180° are known. This means that in the plane of the acting radial force, more balls transmit load in the range of 0–180° than in the range of 180–360°. Due to the uniform load distribution throughout a full rotation of the spindle nut in the ball screw drive of the invention, a constant stiffness is realized. As compared to the stiffness of the spindle nut of a prior art ball screw drive, the stiffness of the rotating nut is higher. Vibrations and noise generation are reduced because it is always the same number of balls in the load-bearing channel that transmit the acting forces. In other words, the two ball openings of the external deflector are spaced at about 360° relative to the spindle axis, so that, in the plane of force application, the same number of balls parallel to the spindle axis transmit forces in the load-bearing channel in any angular position of the spindle nut.

The external deflector can be made as a multi-piece deflecting element comprising a first parting plane that is arranged within and along the return channel and divides the deflecting element into a plurality of deflecting parts. As a rule, the return channel has an approximately circular cross-section, each of the deflecting parts comprising a ball groove that defines this return channel. The division along and within the return channel enables a simple configuration of the ball grooves to be provided on the external deflector. For instance, it becomes possible to use injection molds of a simple configuration that already comprise the required ball grooves. In this way, the external deflector can be made economically out of a plastic by an injection method.

According to an advantageous proposition of the invention, to enable a simple assembly of the ball screw drive of the invention, a second parting plane is arranged crosswise to the return channel and divides the external deflector that is configured as a multi-piece deflecting element into halves, this second parting plane being arranged at least approximately, preferably at a central position between the two ball openings of the external deflector. Thus, on each side of this second parting plane, halves of deflecting parts are formed each of which surrounds the spindle axis around approximately 180°. The two halves of a deflecting part together surround the spindle axis around approximately 360°. The assembly of the halves is simplified. If the external deflector is made of a sufficiently flexible material, it can be bent open so far that the spindle nut fits between the ball openings of the external deflector. In this case, the second parting plane may be omitted.

In an advantageous embodiment of the ball screw drive of the invention that is favorable from the fabrication and assembly point of view, the first and the second parting planes divide the external deflector into two deflecting parts each of which is made up of two halves. These deflecting parts preferably have an identical configuration.

The external deflector is arranged on the spindle nut preferably so that the return channel is connected to the load-bearing channel tangentially and at the lead angle of the ball groove of the spindle nut. This means that high accelerations of the balls upon entering and leaving the return channel are avoided. The return channel itself preferably comprises between the two ball openings, regions of different curvature that merge with one another without discontinuities. So-called polygon effects that could lead to a piling-up of the balls are thus avoided.

If the external deflector has a multi-piece structure, it is advantageous to connect these deflecting parts to one another by positive or force engagement or by a fusion of materials, so that a perfect formation of the return channel is guaranteed.

The external deflector is made preferably of a plastic and typically by an injection molding method. With the choice of a suitable material, for instance, a very low-noise operation can be assured. Advantageously, for reducing disturbing noises, it is also possible to use rubber, rubber-like materials and elastomers as materials for the external deflector.

According to a further feature of the invention, if a toothed belt wheel is arranged on the spindle nut for driving the spindle nut, the external deflector is lodged within the axial length of the toothed belt wheel. In this way, a ball screw drive with a compact configuration in axial direction is formed.

If, as already discussed above, a first parting plane arranged within and along the return channel divides the external deflector that is configured as a multi-piece deflecting element into deflecting parts, it can be advantageous to make one of these deflecting parts integrally with the toothed belt wheel. The total number of parts can thus be reduced.

The invention will now be described more closely with reference to two examples of embodiment illustrated in a total of 20 figures.

DETAILED DESCRIPTION OF THE DRAWINGS

Figure 1:
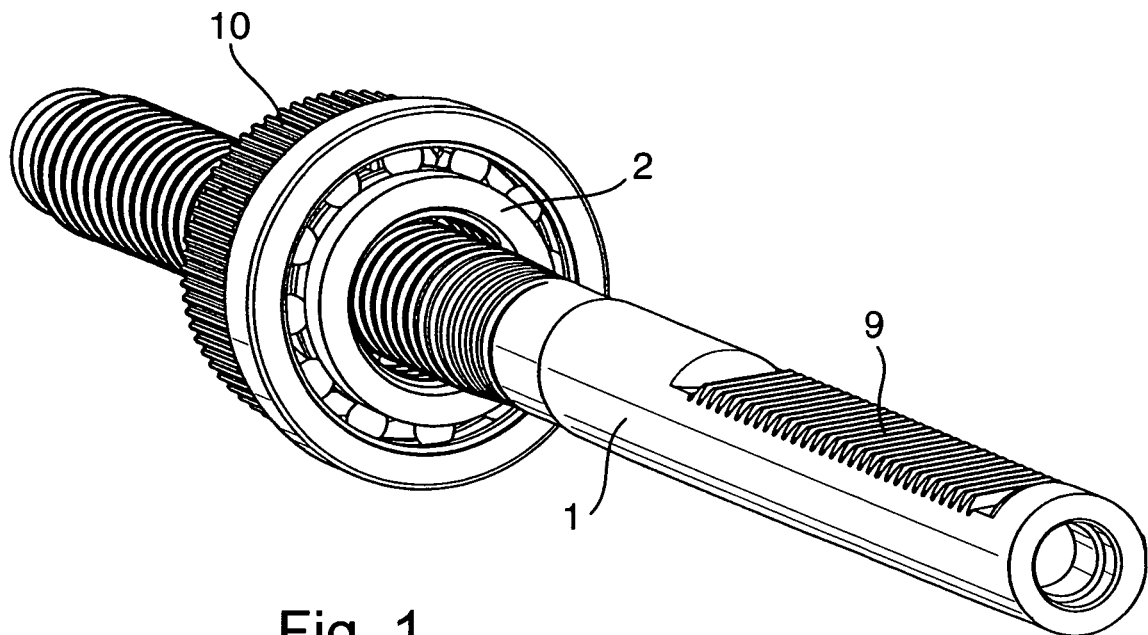
FIG. 1 is a perspective representation of a ball screw drive of the invention.
Figure 2:
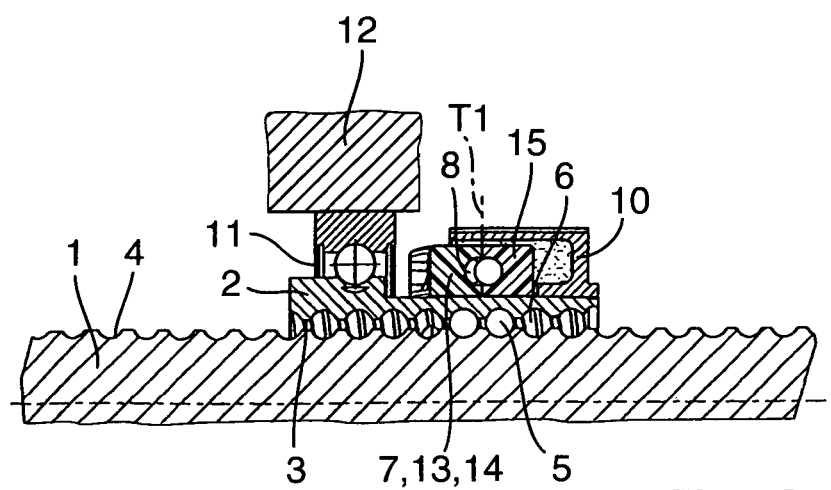
FIG. 2 shows a longitudinal semi-section through the ball screw drive of FIG. 1.

FIG. 1 is a perspective representation of a ball screw drive of the invention and FIG. 2 shows a longitudinal semi-section through this ball screw drive of the invention. A spindle nut 2 disposed on a spindle 1 comprises on its inner periphery a ball groove 3 that is arranged along a helix. The spindle 1 comprises on its outer periphery a ball groove 4 that is arranged along a helix. Balls 5 are arranged between the spindle nut 2 and the spindle 1 and roll on the ball grooves 3 and 4 when the spindle nut 2 is rotated relative to the spindle 1. The ball grooves 3 and 4 define a load-bearing channel 6 in which the balls 5 can roll under load on the ball grooves 3 and 4. The spindle nut 2 further comprises an external deflector 7 that comprises a return channel 8 for the balls 5. The return channel 8 connects the ends of the load-bearing channel 6 endlessly to each other to assure an endless circulation of the balls 5 in the load-bearing channel 6 and in the return channel 8.

The spindle 1 is configured partly as a toothed rack and comprises a toothed rack profile 9. A toothed belt wheel 10 is arranged rotationally fast on the spindle nut 2. The external deflector 7 is arranged substantially within the axial length of the toothed belt wheel 10. The spindle nut 2 is mounted through a radial groove ball bearing 11 for rotation on a machine part 12. For driving the spindle nut 2, the toothed belt wheel 10 is driven by a toothed belt, not shown.

Figure 3:
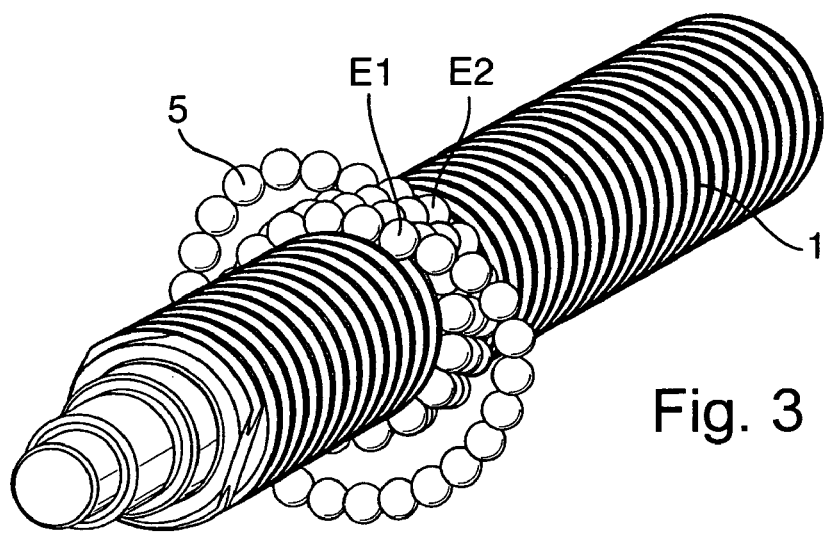
FIG. 3 shows individual components of the ball screw drive of the invention illustrated in FIGS. 1 and 2.
Figure 4:
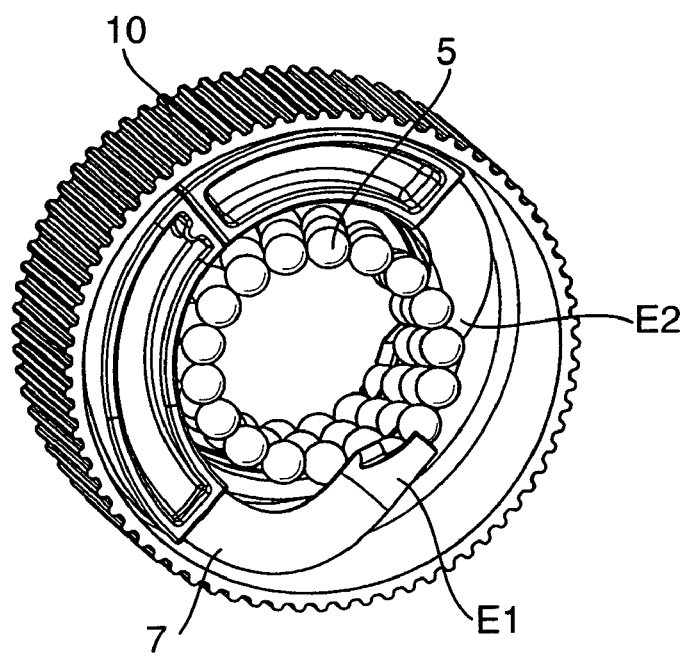
FIG. 4 shows individual components of the ball screw drive of the invention illustrated in FIGS. 1 and 2.

FIG. 3 is a perspective illustration of the spindle 1 showing the balls 5 for the ball screw drive as arranged in the return channel and in the load-bearing channel. At the point where the balls 5 leave the ball groove 4 of the spindle 1 i.e., at the point where they enter the external deflector 7 is situated a ball opening E1 of the external deflector. At the point where the balls 5 leave the external deflector 7, not shown in this figure, is situated the other ball opening E2 of the external deflector 7. The positions of the ball openings E1 and E2 of the external deflector 7 are shown in FIG. 4. From FIG. 3 it can be seen that approximately one full winding about the axis of rotation of the spindle nut 2 is included between the ball opening E1 and the ball opening E2. FIG. 3 also clearly shows that, from its one ball opening E1 up to its other ball opening E2, the external deflector 7 extends over one full winding about the axis of rotation of the spindle nut 2.

The path of the balls 5 between the two ball openings E1 and E2 corresponds to the path of the return channel 8, not shown in FIG. 3.

FIG. 4 shows the toothed belt wheel 10 with the external deflector 7 and the set of balls 5 in a perspective representation.

Figure 5:
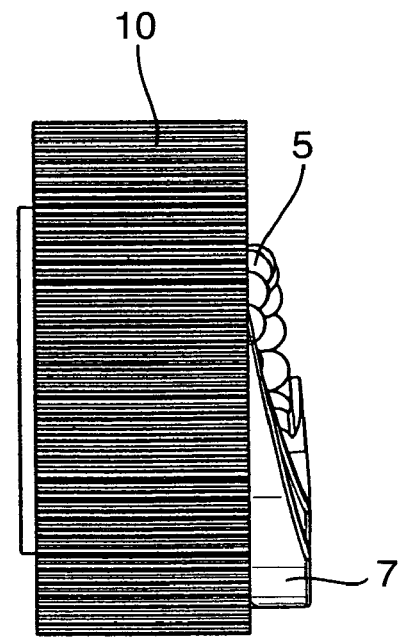
FIG. 5 shows individual components of the ball screw drive of the invention illustrated in FIGS. 1 and 2.
Figure 6:
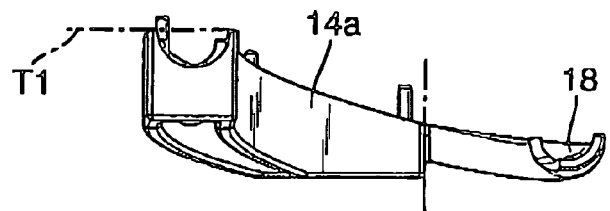
FIG. 6 shows individual components of the ball screw drive of the invention illustrated in FIGS. 1 and 2.
Figure 7:
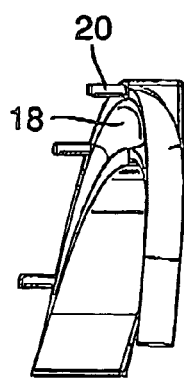
FIG. 7 shows individual components of the ball screw drive of the invention illustrated in FIGS. 1 and 2.

FIG. 5 shows a top view of the components illustrated in FIG. 4.

From FIG. 2 it can be seen further that a first parting plane T1 that is arranged within and along the return channel 8, divides the external deflector 7 that is configured as a multi-piece deflecting element 13 into deflecting parts 14, 15.

Figure 8:
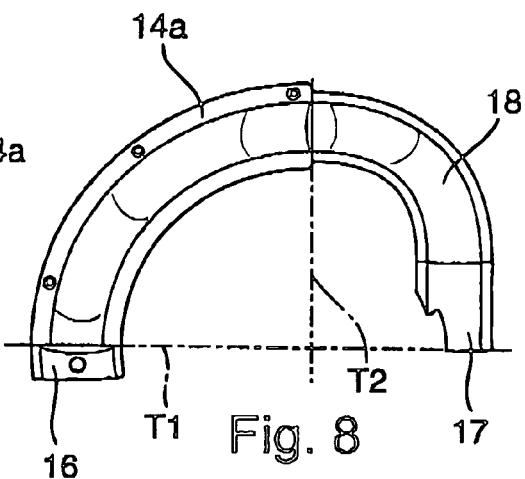
FIG. 8 shows individual components of the ball screw drive of the invention illustrated in FIGS. 1 and 2.
Figure 9:
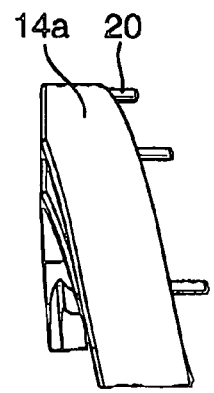
FIG. 9 shows individual components of the ball screw drive of the invention illustrated in FIGS. 1 and 2.

In FIGS. 6 to 9, one half 14a of the deflecting part 14 is shown in different perspective views. A second parting plane T2 roughly indicated in FIG. 8, is arranged approximately centrally between the two ball openings E1 and E2 of the external deflector 7 and divides the deflecting part 14 into two halves. FIG. 8 clearly shows a ball groove 18 that is configured on the half 14a along the parting plane T1 and defines the return channel 8.

Figure 10:
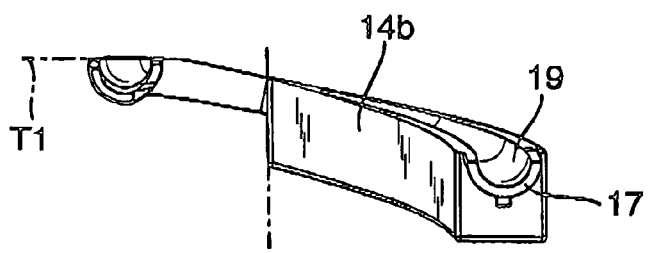
FIG. 10 shows individual components of the ball screw drive of the invention illustrated in FIGS. 1 and 2.
Figure 11:
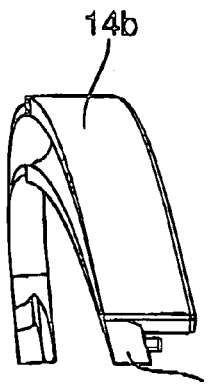
FIG. 11 shows individual components of the ball screw drive of the invention illustrated in FIGS. 1 and 2.
Figure 12:
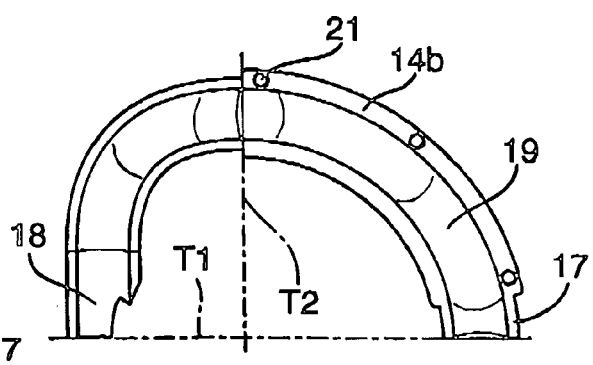
FIG. 12 shows individual components of the ball screw drive of the invention illustrated in FIGS. 1 and 2.
Figure 13:
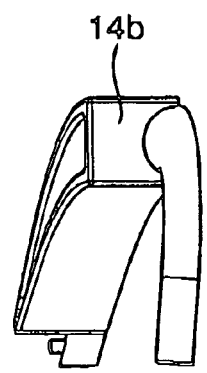
FIG. 13 shows individual components of the ball screw drive of the invention illustrated in FIGS. 1 and 2.

The other half 14b of the deflecting part 14 is shown in different perspective views in FIGS. 10 to 13. These two halves 14a and 14b together form the deflecting part 14. The parting plane T2 is shown in FIG. 12. The deflecting part 15 has a configuration identical to that of the deflecting part 14. FIG. 10 clearly shows a ball groove 19 that is configured on the half 14b along the parting plane T1 and defines the return channel 8.

Thus, in this ball screw drive of the invention, the multi-piece deflecting element 13 comprises a total of two deflecting parts 14, 15, each of which is made up of the halves 14a and 14b. The first parting plane T1 permits the use of simple injection molds. The second parting plane T2 enables the two halves 14a and 14b to be assembled in an unproblematic manner to form the respective deflecting parts 14 and 15, each half 14a, 14b extending over about 180° about the spindle axis.

Figure 14:
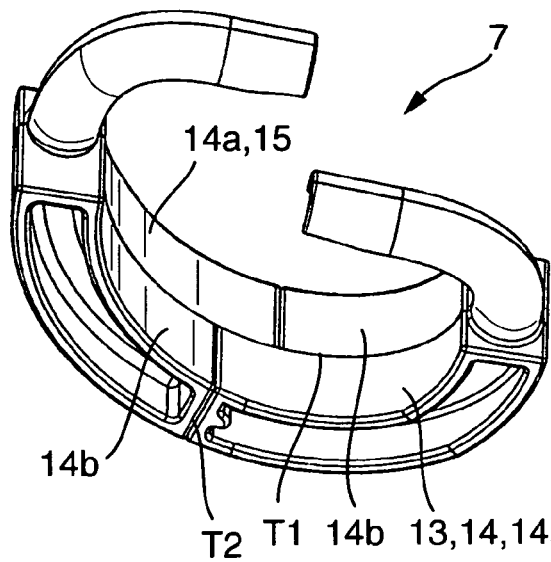
FIG. 14 shows individual components of the ball screw drive of the invention illustrated in FIGS. 1 and 2.

The half 14a comprises a reception 16 on one of its ends, and the half 14b comprises on one of its ends, a projection 17. In the parting plane T1, the half 14a comprises projecting pegs 20 arranged crosswise to the parting plane T1, The half 14b comprises in the parting plane T1, bores 21 arranged crosswise to the parting plane T1. Two halves 14a and 14b are assembled together by placing their surfaces along the parting plane T1 against each other, so that the pegs 20 engage the bores 21. Two halves 14a and 14b are assembled together by placing their one ends adjoining the parting plane T2 behind each other, so that the projections 17 engage the receptions 16. The four assembled halves form the deflecting element 13 as shown in the perspective representation of FIG. 14.

Figure 15:
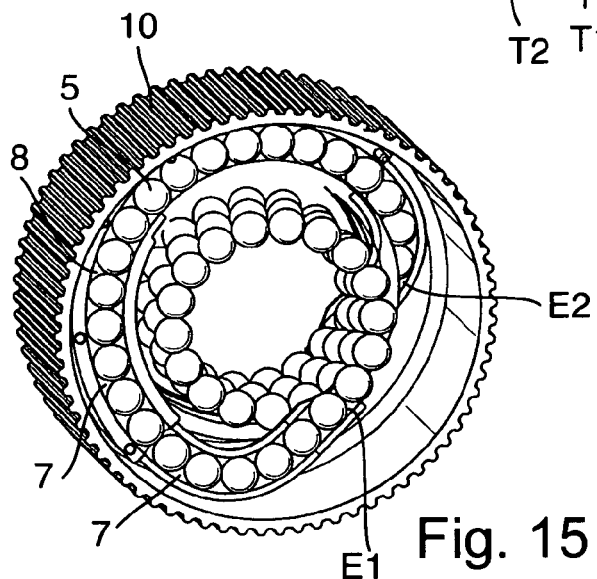
FIG. 15 shows components of a further ball screw drive of the invention.
Figure 16:
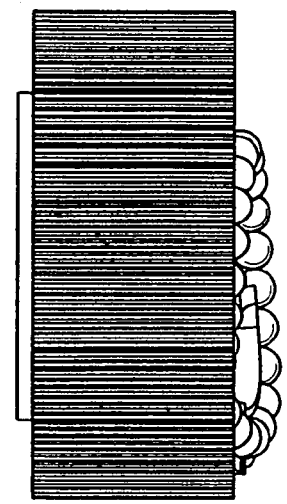
FIG. 16 shows components of the further ball screw drive of the invention.
Figure 17:
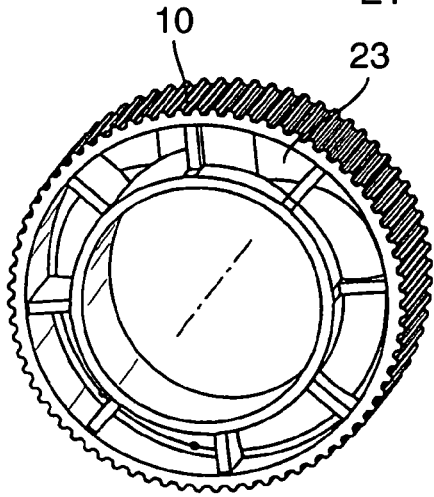
FIG. 17 shows components of the further ball screw drive of the invention.
Figure 18:
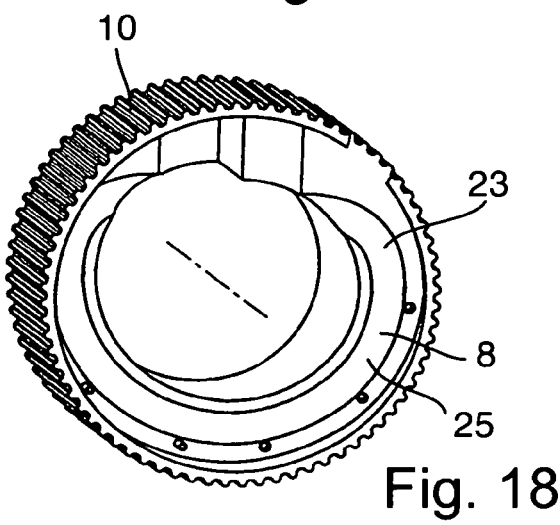
FIG. 18 shows components of the further ball screw drive of the invention.

The ball screw drive of the invention illustrated in FIGS. 15 to 20 differs from the already described ball screw drive of the invention mainly in that the external deflector 7 comprises only the first parting plane T1 that is arranged within and along the return channel 8 and, in the present embodiment, divides a multi-piece deflecting element 22 into a total of two deflecting parts 23, 24 FIG. 15 shows the toothed wheel 14 with the external deflector 7 and the set of balls 5 in a perspective representation. FIG. 16 is a top view of the ball screw drive of the invention illustrated in FIG. 15. FIGS. 17 and 18 show the deflecting part 23 that is made integrally with the toothed belt wheel 10. The deflecting part 23 comprises a ball groove 25 that defines the return channel 8.

Figure 19:
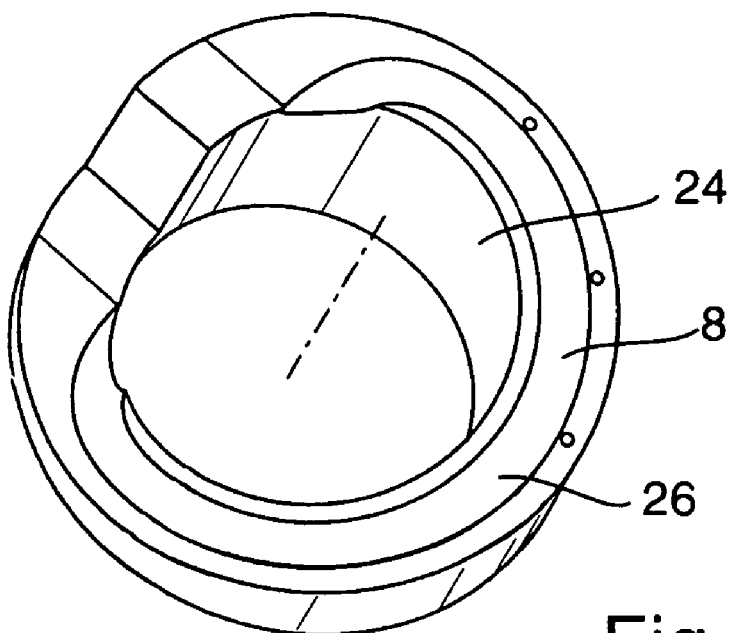
FIG. 19 shows components of the further ball screw drive of the invention.
Figure 20:
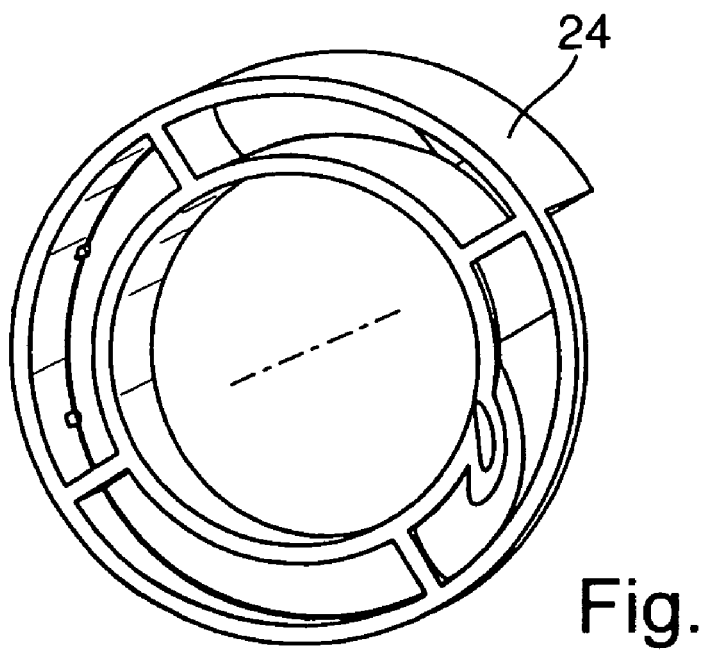
FIG. 20 shows components of the further ball screw drive of the invention.

The other deflecting part 24 is shown in perspective representations in FIGS. 19 and 20. The deflecting part 24 comprises a ball groove 26 that defines the return channel 8. In the present embodiment, the external deflector 7 consists only of the deflecting part 23, that is made integrally with the toothed belt wheel 10, and the deflecting part 24, that is made as a separate part.

A feature common to both examples of embodiment of the invention is that an angle of approximately 360° extends around the spindle axis between the two ball openings E1 and E2 of the external deflector 7. It this way, a uniform loading of the balls 5 in the load-bearing channel 6 is assured during a full rotation of the spindle nut 2 when stationary radial forces act on the toothed belt wheel 10.

It can be seen in FIG. 2 that in the plane illustrated, two balls 5 are arranged behind each other. Thus, if an imaginary force acting on the spindle nut 2 is situated in this plane, four balls 5 are arranged in this plane in every angular position of the spindle nut 2, viz., two above and two below the spindle axis. Further, in both cases, the return channels 8 are connected to the load-bearing channel 6 tangentially and at the lead angle of the ball groove 3 of spindle nut 2. The return channels 8 comprise regions of different curvature that merge with one another without discontinuities.

The invention claimed is:

1. A ball screw drive comprising a spindle nut that can be disposed on a spindle, said spindle nut comprising on an inner periphery, a ball groove that is arranged along a helix and defines a load-bearing channel for balls, an external deflector comprising a return channel for the balls being arranged on an outer periphery of the spindle nut, said external deflector comprising two ball openings, each of which is connected to an end of the load-bearing channel to deflect the balls from one end of the load-bearing channel to the other end of the load-bearing channel, wherein the external deflector extends from one of the two ball openings to the other of the two ball openings at least over one full winding about an axis of rotation of the spindle nut.

2. A ball screw drive of claim 1, wherein a first parting plane arranged within and along the return channel divides the external deflector that is configured as a multi-piece deflecting element into deflecting parts.

3. A ball screw drive of claim 1, wherein a second parting plane is arranged crosswise to the return channel and divides the external deflector that is configured as a multi-piece deflecting element into halves, said second parting plane being arranged at least at a central position between the two ball openings of the external deflector.

4. A ball screw drive of claim 2, wherein the external deflector is divided by the first parting plane and a second parting plane into two deflecting parts, each of which is made up of two halves.

5. A ball screw drive of claim 1, wherein the return channel is connected to the load-bearing channel tangentially and at a lead angle of the ball groove of the spindle nut.

6. A ball screw drive of claim 5, wherein the return channel comprises between the two ball openings of the outer deflector, regions of different curvature that merge with one another without discontinuities.

7. A ball screw drive according to claim 1, wherein the deflecting parts are connected to one another by one of positive engagement, force engagement or fusion of materials.

8. A ball screw drive according to claim 1, wherein the external deflector is made of a plastic, typically by an injection molding method.

9. A ball screw drive according to claim 1, wherein a toothed belt wheel is arranged on the spindle nut, and the external deflector is lodged inside an axial length of said toothed belt wheel.

10. A ball screw drive according to claim 9, wherein one of the deflecting parts of the deflecting element is made integrally with the toothed belt wheel.

* * * * *